United States Patent
Belfiore et al.

(10) Patent No.: US 11,808,837 B2
(45) Date of Patent: *Nov. 7, 2023

(54) METHOD OF OPERATING RADAR SENSOR SYSTEMS WITH TIME SEQUENCED HIGH PASS FILTERS

(71) Applicant: STMicroelectronics S.r.l., Agrate Brianza (IT)

(72) Inventors: Francesco Belfiore, Catania (IT); Salvatore Scaccianoce, Catania (IT); Amedeo Michelin Salomon, Messina (IT); Antonino Calcagno, Messina (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 143 days.

This patent is subject to a terminal disclaimer.

(21) Appl. No.: 17/543,175

(22) Filed: Dec. 6, 2021

(65) Prior Publication Data

US 2022/0091250 A1 Mar. 24, 2022

Related U.S. Application Data

(63) Continuation of application No. 16/273,737, filed on Feb. 12, 2019, now Pat. No. 11,194,035.

(30) Foreign Application Priority Data

Feb. 13, 2018 (IT) .......................... 102018000002649

(51) Int. Cl.
*G01S 13/53* (2006.01)
*G01S 7/285* (2006.01)
(Continued)

(52) U.S. Cl.
CPC ................ *G01S 13/53* (2013.01); *G01S 7/03* (2013.01); *G01S 7/282* (2013.01); *G01S 7/285* (2013.01);
(Continued)

(58) Field of Classification Search
CPC . G01S 13/53; G01S 7/03; G01S 7/282; G01S 7/285; G01S 7/354; G01S 7/41;
(Continued)

(56) References Cited

U.S. PATENT DOCUMENTS

2014/0313068 A1* 10/2014 Evans ................... G01S 13/347
342/90
2014/0313071 A1* 10/2014 Mccorkle .............. G01S 13/106
342/202

(Continued)

FOREIGN PATENT DOCUMENTS

| EP | 0048394 A1 | 3/1982 |
| FR | 1540352 A | 9/1968 |
| JP | 2008190965 A | 8/2008 |

*Primary Examiner* — Donald H B Braswell
(74) *Attorney, Agent, or Firm* — Slater Matsil, LLP

(57) ABSTRACT

A method of operating a radar sensor system includes: frequency down-converting a reception signal that is chirp-modulated with a sequence of chirp ramps to an intermediate frequency signal; and high-pass filtering the intermediate frequency signal to produce a high-pass filtered signal. High-pass filtering includes: first high-pass filtering, with a first corner frequency, the intermediate frequency signal at each chirp in the chirp modulation of the reception signal; and replacing the first high-pass filtering with a second high-pass filtering with a second corner frequency, the first corner frequency being higher than the second corner frequency.

20 Claims, 2 Drawing Sheets

(51) Int. Cl.

| | | |
|---|---|---|
| *G01S 13/931* | (2020.01) | |
| *G01S 13/34* | (2006.01) | |
| *G01S 13/42* | (2006.01) | |
| *G01S 13/536* | (2006.01) | |
| *G01S 7/35* | (2006.01) | |
| *G01S 7/03* | (2006.01) | |
| *G01S 7/41* | (2006.01) | |
| *G01S 7/282* | (2006.01) | |

(52) U.S. Cl.
CPC ............... *G01S 7/354* (2013.01); *G01S 7/41* (2013.01); *G01S 13/343* (2013.01); *G01S 13/42* (2013.01); *G01S 13/536* (2013.01); *G01S 13/931* (2013.01)

(58) Field of Classification Search
CPC ...... G01S 13/343; G01S 13/42; G01S 13/536; G01S 13/931; G01S 7/2923; G01S 7/32
See application file for complete search history.

(56) References Cited

U.S. PATENT DOCUMENTS

| | | | |
|---|---|---|---|
| 2015/0084811 A1* | 3/2015 | Mazzaro ............... | G01S 13/343 342/175 |
| 2016/0266239 A1* | 9/2016 | Pavao-Moreira ....... | G01S 13/34 |
| 2017/0315209 A1* | 11/2017 | Johnson ................... | G01S 7/35 |
| 2017/0343648 A1* | 11/2017 | Trotta .................... | G01S 13/584 |
| 2018/0115371 A1* | 4/2018 | Trotta ..................... | H04B 1/38 |
| 2019/0086530 A1 | 3/2019 | Fleizach et al. | |
| 2019/0219687 A1* | 7/2019 | Baheti .................... | G01S 7/415 |
| 2019/0250264 A1 | 8/2019 | Belfiore et al. | |

\* cited by examiner

METHOD OF OPERATING RADAR SENSOR SYSTEMS WITH TIME SEQUENCED HIGH PASS FILTERS

CROSS-REFERENCE TO RELATED APPLICATIONS

This application is a continuation application of U.S. patent application Ser. No. 16/273,737, filed on Feb. 12, 2019, which claims priority to Italian Patent Application No. 102018000002649, filed on Feb. 13, 2018, which applications are hereby incorporated herein by their reference.

TECHNICAL FIELD

The description relates generally to radar systems, and in particular embodiments, to a method of operating radar sensor systems, corresponding circuit, system, and vehicle.

BACKGROUND

Frequency-modulated continuous-wave (FMCW) radar sensors are used in various areas, including automotive and consumer applications, due to the possibility of achieving high accuracy with a low-cost, relatively simple technique.

Despite the extensive activity in the area, further improved solutions are desirable capable of achieving high accuracy at a reduced cost, for use e.g. in automotive and consumer applications.

SUMMARY

An object of one or more embodiments is to contribute in providing such an improved solution.

One or more embodiments may relate to a corresponding circuit (e.g. an integrated circuit for use in implementing the method according to embodiments).

One or more embodiments may relate to a corresponding system (e.g. a radar sensor).

One or more embodiments may relate to a corresponding vehicle (e.g. a motor car equipped with a radar sensor according to embodiments).

One or more embodiments developed by paying attention to the possible use in receiver chains for 77 GHz radar applications with FMCW modulation.

One or more embodiments are however applicable to virtually any possible range of operating frequencies, compatible with the limits of the technology involved.

One or more embodiments may provide a new approach in high-pass filter setting during operation of a FMCW modulator in a radar sensor and possible circuit implementations of that approach.

One or more embodiments may include an autonomous switchable dual high-pass filter arranged downstream (that is, after or subsequent to) the down converter mixer of a radar receiver chain.

In one or more embodiments, in such a switchable architecture, the high pass corner frequency (also referred to as the "cut-off" or "breakpoint" frequency) can be set to a high value for a programmable time window and then set to the value currently envisaged for the radar system.

One or more embodiments may produce a reduction of an undesirably strong signal at the beginning of the FMCW chirp without this resulting in signal degradation during sampling data.

One or more embodiments may advantageously adopt both a fast signal ramp, as desirable for long-range applications, and low intermediate frequency (IF), as desirable for short-range applications. One or more embodiments are thus suited for both long-range and short-range applications.

One or more embodiments are suited to be integrated in a radar chip without negative impact on the overall performance of the chip.

One or more embodiments can be used e.g. in integrated circuits on silicon (CMOS, Bipolar, BiCMOS technology), for radio frequency RF (e.g. microwave—MW) applications e.g. ultra-wide band (UWB) FMCW detection systems for automotive and consumer applications.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

One or more embodiments may be applied e.g. to frequency-modulated continuous-wave (FMCW) radar sensors.

As noted, FMCW radar sensors are used in various areas, including automotive and consumer applications, due to the possibility of achieving high accuracy with a low-cost, relatively simple technique.

An underlying principle of operation of a conventional FMCW radar sensor involves generating a FMCW-modulated signal including a sequence of "chirps" (e.g. Chirp_1, Chirp_2, . . . , Chirp_n as exemplified in FIG. 1), with the frequency f of the signal swept ramp-like (e.g. linearly) from a lower to an upper value during each chirp.

To that effect, a sort of "sawtooth-like" modulating signal can be applied to a voltage-controlled oscillator (VCO) with the frequency-modulated (FM) signal from the VCO in turn applied to a transmitter (TX) amplifier to produce a signal sent towards the target.

Figure 2:
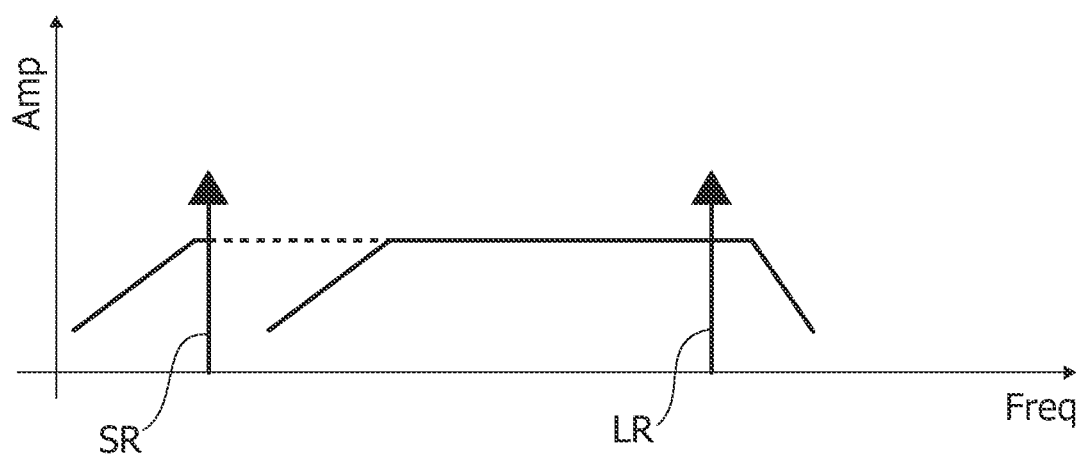

The received signal (RX_signal) as reflected from a target may be frequency down-converted using the signal from the VCO and the resulting intermediate frequency (IF) signal may have an amplitude (e.g. magnitude) v. frequency behavior as exemplified in FIG. 2 which depends both on the distance of the target and the slope of the ramp in the FM "chirp" signal.

The IF signal is thus indicative of the distance of the target, with lower frequencies corresponding to short-range targets and higher frequencies corresponding to long-range targets.

Figure 1:
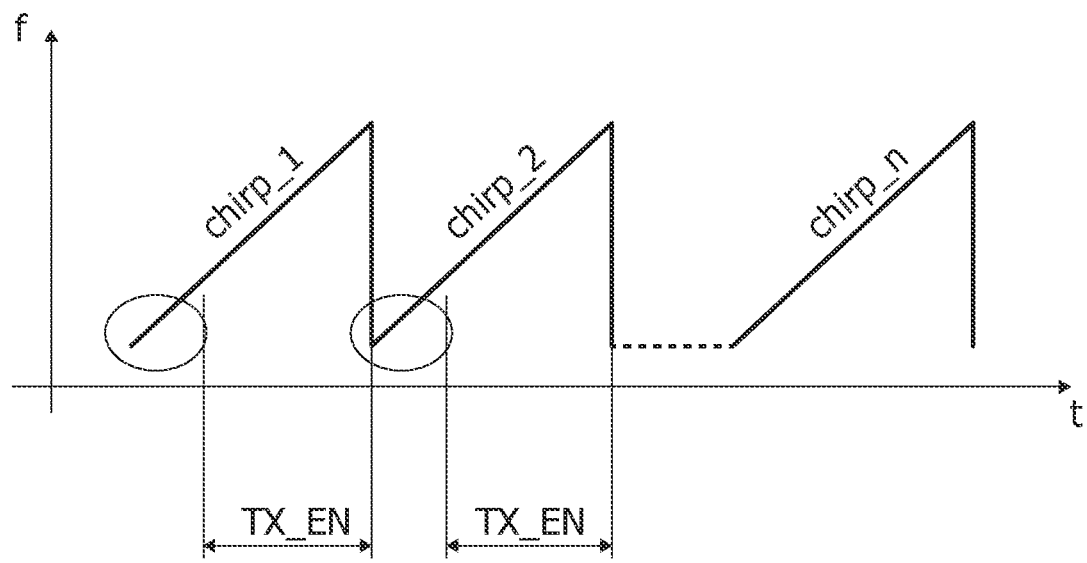
FIGS. 1 and 2 are generally exemplary of certain criteria underlying operation of FMCW radar systems.

Operation of a FMCW radar sensor as recapped in the foregoing may involve enabling the transmission (TX) amplifier only during the chirp signal ramp: see e.g. TX_EN in FIG. 1. That facilitates optimizing the useful bandwidth, which results in an increased resolution in the target.

A continuous trend exists in FMCW radar applications to use "fast" chirp modulations for both short-range and long-range application, with the capability of using a same device for both applications representing a desirable feature.

Also, in order to increase resolution, using as large a bandwidth as permitted is pursued as a target, which may involve a dynamic management of the TX enable signal (TX_EN).

These operating conditions, e.g. a power-on at the beginning of the ramp, may suddenly activate the IF signal and the associated process of charging capacitors (e.g. large capacitors) in the high pass filter in the IF signal path. This may result in a (high) transient DC offset which may saturate the output of the variable gain amplifier (VGA) which amplifies the IF signal so that processing thereof (in a conventional manner) is facilitated.

Various approaches can be devised in order to address that issue.

A first solution may involve reducing the VGA gain, which can compromise the overall receiver sensitivity.

Another solution may involve increasing the TX enable window in order to render the saturated region before the useful signal somewhat "smoother". In that case the bandwidth, and the resolution of the target distance, will be reduced.

Still another solution may involve increasing the high-pass filter corner in filtering the (small) IF signal. A possible outcome is that small close target may be missed. Also, such an approach may limit the use of the detection device (both for long-range and short-range applications) with fast ramp modulation.

Figure 3:
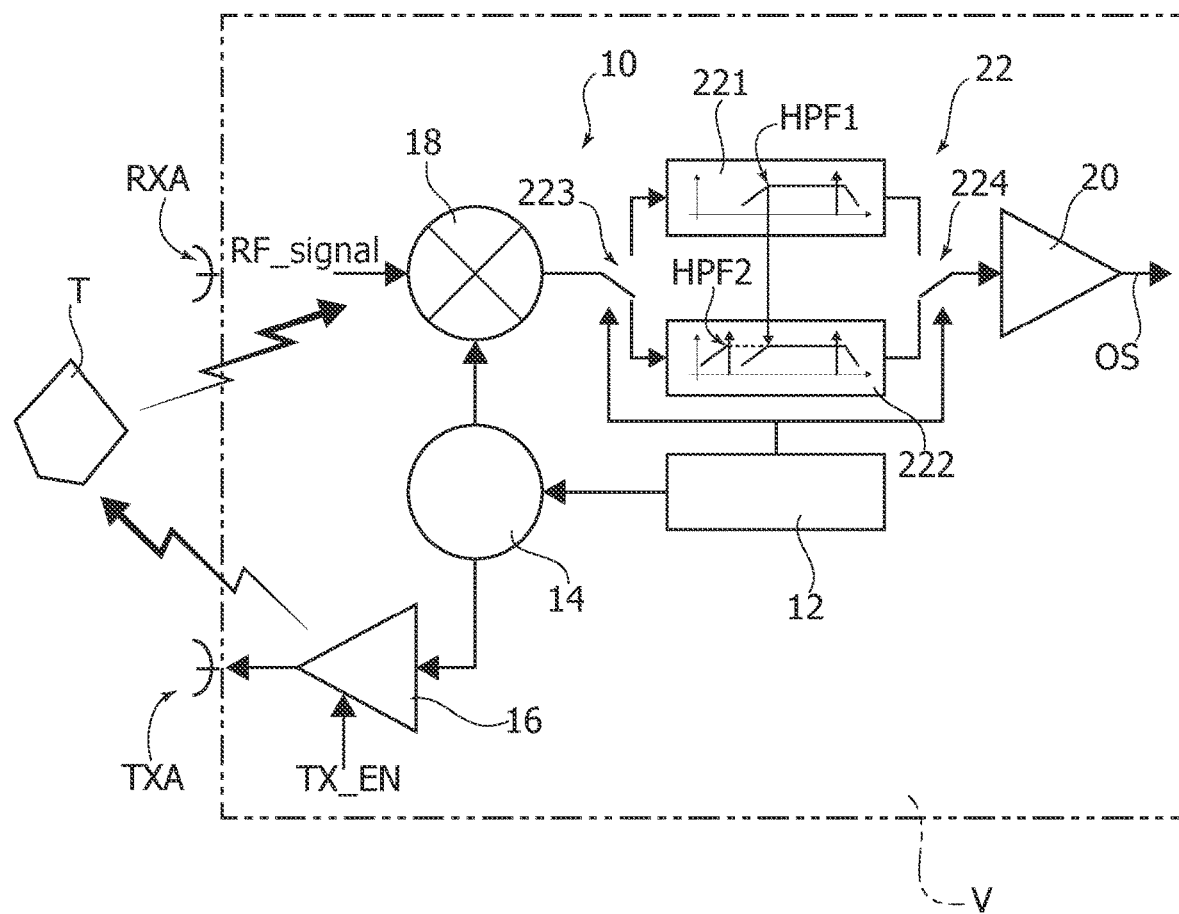
FIG. 3 is an exemplary block diagram illustrating circuit components of embodiments.

One or more embodiments as exemplified herein adopt a switchable high-pass filter arrangement as shown in FIG. 3.

FIG. 3 shows a block diagram of a FMCW radar sensor 10 for detecting the presence, the position (e.g. distance) and possibly the speed of a target object T.

For instance, the radar sensor system 10 may be mounted on board a vehicle V such as a motor car with the capability of detecting the presence/distance of other vehicles nearby, pedestrians crossing, obstacles in parking and so on.

Operation of such a sensor involves sending towards the target T a RF (e.g. microwave) signal and collecting a corresponding received signal RF_signal reflected from the target.

The principles of operation and various possible implementations of such a sensor system are well known in the art, thus making it unnecessary to provide a more detailed description herein.

For the purpose of exemplifying embodiments, one may note that a FMCW radar sensor system 10 may produce a FMCW transmission signal to be sent towards a (possible) target T to be detected.

The FMCW transmission signal includes a sequence of "chirps" (e.g. Chirp_1, Chirp_2, . . . , Chirp_n as exemplified in FIG. 1), with the frequency f of the signal swept ramp-like (e.g. linearly) from a lower to an upper value during each chirp.

To that effect a modulator circuit 12 may be provided to produce "sawtooth-like" modulating signal which is applied to a voltage-controlled oscillator (VCO) circuit 14.

The frequency-modulated (FM) signal from the VCO 14 is applied to a transmitter (TX) amplifier 16 to produce the signal sent towards the target (e.g. via a transmitter antenna TXA). The TX amplifier is enabled by a signal TX-EN (e.g. as obtained from the modulator circuit 12) in order to become active during the ramp of the FMCW signal over a time window (slightly) delayed with respect to the time of start of the ramp.

The received signal (RX_signal) as reflected from a target T (as received e.g. via a receiver antenna RXA) will be a chirp-modulated signal suited to be frequency down-converted a mixer circuit stage using the signal from the VCO 14 to produce a resulting intermediate frequency (IF) signal.

As discussed previously, the amplitude v. frequency behavior of the IF signal is indicative of the distance of the target. Processing such a signal may facilitate obtaining, in addition to the distance, various other target-related parameters such as position (radial/angular), speed and so on. A variety of corresponding processing techniques are known in the art for that purpose, which per se are not relevant to the embodiment.

For the purposes herein it will suffice to recall that such processing is facilitated by avoiding that the amplifier 20 (e.g. variable gain of amplifier 20) which amplifies the IF signal may undergo undesired phenomena (e.g. a transient DC offset leading to output saturation as discussed previously) caused by sudden activations of the IF signal.

One or more embodiments may address that issue by providing in the IF signal path from the mixer circuit 18 to the output amplifier (e.g. VGA) 20 a double-filter arrangement 22 including a first high-pass filter (HPF1) 221 and a second high-pass filter (HPF2) 222, with the first filter 221 having a (low-end) corner frequency which is higher than the homologous frequency of the second filter 222.

As well known, the corner frequency (also referred to as "cut-off" or "breakpoint" frequency) is a basic parameter in filters such as high-pass filters. A high-pass filter is an electronic filter that passes signals with a frequency higher than a certain cut-off/corner/breakpoint frequency and attenuates signals with frequencies lower than the cutoff/corner/breakpoint frequency.

One or more embodiments may contemplate that, at each ramp, filtering of the IF signal is at first performed by the first HF filter 221 (the one with a higher corner frequency, HPF1) and then, after a (programmable) time, by the second HF filter 222 (the one with a lower corner frequency, HPF2).

In one or more embodiments as exemplified in FIG. 3, the two filters 221 and 222 may be arranged in a circuit portion between the mixer circuit 18 and the output amplifier 20 with two switches 223, 224 (e.g. controlled by the modulator 12, thus facilitating synchronization with the ramps of the FMCW signal) which cause the IF from the mixer circuit 18 to follow:

at first (e.g. during a time window located in an initial part of the ramp) a first path through the first HF filter 221 to the amplifier 20, and then (e.g. after a programmable time set by the modulator circuit 12) a second path through the second HF filter 221 to the amplifier 20.

It will be otherwise appreciated that the implementation shown in FIG. 3 is merely exemplary and various alternative may be devised by those of skill in the art.

Just to mention two possible, non-limiting examples, in one or more embodiments:

the two filters 221 and 222 may be replaced by a single filter having a selectively variable transfer function, that is with a corner frequency which can be selectively varied between a first, higher value (HPF1) and a second, lower value (HPF2);

switching between the two HF filtering characteristics being synchronized with the ramps of FMCW signal may be obtained with other circuits than the modulator circuit 12 (e.g. via a PLL circuit locked to the RF_signal).

Figure 4:
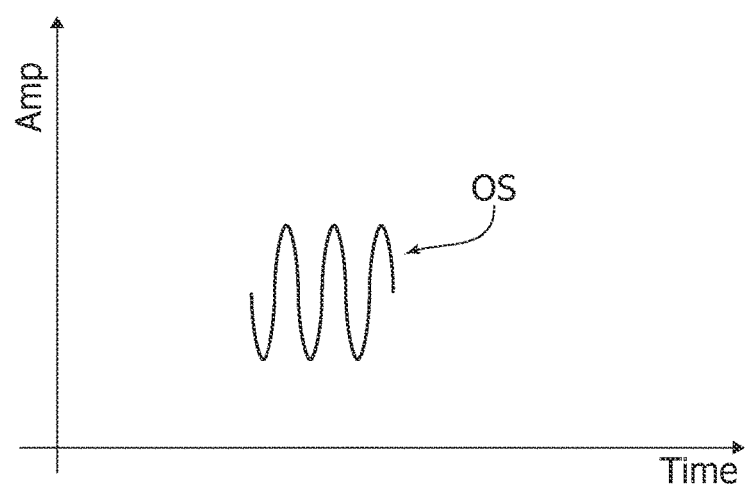
FIG. 4 is exemplary of the possible time behavior of a received signal in embodiments.

Whatever the specific implementation adopted, one or more embodiments may facilitate obtaining an output signal OS from the amplifier 20 as exemplified in FIG. 4, e.g. a signal where any DC offset may be "smoothed" rapidly e.g. before the signal OS is made available for further processing e.g. by sampling by an analog-to-digital converter (ADC—not visible in the figures).

Just by way of non-limiting example, the following exemplary figures may apply for a 77 GHz radar applications for the consumer automotive sector with FMCW modulation:

chirp rate: from 0.003 Ghz/μs to 0.5 GHz/μs;
chirp modulation (sweep) range: from 0.2 Ghz to 4 GHz;
VCO frequency range: from 76 Ghz to 81 GHz;
first corner frequency (HPF1—filter 221): max 5 MHz;
second corner frequency (HPF2—filter 222): min 50 KHz;
programmable time delay of switching to second filtering (filter 222, corner frequency HPF2) after start of chirp ramp: from 0 μs to 5 μs.

One or more embodiments may thus relate to a method of operating a radar sensor system wherein a reception signal (e.g. RF_signal) chirp-modulated with a sequence of chirp ramps (see e.g. Chirp_1, Chirp_2, . . . , Chirp_n in FIG. 1) is frequency down-converted (e.g. at mixer 18) to an intermediate frequency signal and the intermediate frequency signal high-pass filtered (e.g. 221, 222) to produce therefrom a high-pass filtered signal (OS, e.g. for further processing such as ADC conversion). The method may include applying to the intermediate frequency signal, at each chirp in the chirp modulation of the reception signal, high-pass filtering starting with first high-pass filtering (e.g. filter 221) with a first corner frequency (e.g. HPF1) subsequently replaced (e.g. after a possibly adjustable time interval) by second high-pass filtering (e.g. filter 222) with a second corner frequency (e.g. HPF2), the first corner frequency being higher than the second corner frequency.

One or more embodiments may include generating (e.g. using modulator 12 and VCO 14) a transmission signal to produce the reception signal as a result of reflection of the transmission signal at a detection target (e.g. target object T), the transmission signal chirp-modulated with a sequence of chirp ramps (so that the received signal back reflected from a target T is similarly chirp-modulated) and the method may include controlling (e.g. via the modulator 12 and the switches 223, 224) replacing the first high-pass filtering with the second high-pass filtering as a function of the sequence of chirp ramps chirp-modulating the transmission signal.

One or more embodiments may include amplifying the transmission signal by a transmission amplifier (e.g. amplifier 16) activated discontinuously, with the transmission amplifier enabled (e.g. TX_EN) during the chirp ramps.

One or more embodiments may include: an input node (e.g. the mixer circuit 18) configured to receive a radar reception signal chirp-modulated with a sequence of chirp ramps and frequency down-convert the reception signal to an intermediate frequency signal; and a high-pass filter circuit configured to receive the intermediate frequency signal and produce therefrom a high-pass filtered signal. The high-pass filter circuit includes first and second high-pass filtering arrangements (e.g. two filters such as 221, 222 or a single adjustable filter) with a first and a second corner frequency, respectively, the first corner frequency being higher than the second corner frequency. The high-pass filter circuit is configured (see e.g. the switches 223, 224) to provide at each chirp in the chirp modulation high-pass filtering starting with first high-pass filtering with a first corner frequency subsequently replaced by second high-pass filtering with a second corner frequency, the first corner frequency being higher than the second corner frequency.

One or more embodiments may include: an output node (e.g. the amplifier 20) with the high-pass filter circuit intermediate the input node and the output node, wherein the high-pass filter circuit includes a first high-pass filter with the first corner frequency and a second high-pass filter with the second corner frequency; a first switch (e.g. switch 223) activatable to direct the intermediate frequency signal from the input node towards either one of the first high-pass filter and the second high-pass filter; a second switch (e.g. switch 224) activatable to direct towards the output node the high-pass filtered signal from either one of the first high-pass filter and the second high-pass filter; the first switch and the second switch jointly activatable to provide first and second filtering paths for the intermediate frequency signal from the input node to the output node via the first high-pass filter and the second high-pass filter, respectively.

One or more embodiments may include a chirp modulator (e.g. modulator 12 and VCO 14) configured to generate a transmission signal to produce the reception signal as a result of reflection of the transmission signal at a detection target, the chirp modulator configured to produce sequences of chirp ramps, wherein the high-pass filter circuit is coupled to the chirp modulator to provide at each chirp in the chirp modulation alternated activation of the first high-pass filtering arrangement and the second high-pass filtering arrangement.

One or more embodiments may include an output node with the high-pass filter circuit intermediate the input node and the output node, wherein the output node includes an amplifier (e.g. amplifier 20), optionally a variable gain amplifier, active on the high-pass filtered signal from the high-pass filter circuit.

One or more embodiments may include: a chirp modulator configured to generate a transmission signal to produce the reception signal as a result of reflection of the transmission at a detection target, the chirp modulator configured to produce sequence of chirp ramps; and a transmission amplifier (e.g. amplifier 16) configured to amplify the transmission signal, the transmission amplifier activatable discontinuously, with the transmission amplifier configured to enabled during the chirp ramps.

One or more embodiments may relate to a radar sensor system, including: a circuit (e.g. radar sensor 10) according to one or more embodiments; a transmitter antenna (e.g. TXA) configured to transmit a transmission signal to produce the reception signal as a result of reflection of the transmission signal at a detection target; and a receiver antenna (e.g. RXA) configured to receive the reception signal, the receiver antenna coupled to the input node of the circuit to transfer thereto the reception signal.

One or more embodiments may relate to a vehicle (e.g. V, such as a motorcar) equipped with a radar sensor system (e.g. TXA, RXA, radar sensor 10) according to one or more embodiments.

Without prejudice to the underlying principles, the details and embodiments may vary, even significantly, with respect to what has been described by way of example only, without departing from the extent of protection.

What is claimed is:

1. A method of operating a radar sensor system, the method comprising:
   frequency down-converting, at a mixer, a received signal reflected from a target to an intermediate frequency signal, the received signal comprising a sequence of chirp ramps; and
   at each chirp ramp, high-pass filtering the intermediate frequency signal,
      with a first corner frequency during a first time segment of the chirp ramp, and
      with a second corner frequency during a second time segment of the chirp ramp, the first corner frequency being higher than the second corner frequency.

2. The method of claim 1, wherein, during the first time segment, the intermediate frequency signal is transferred through a first path comprising a first high-pass filter circuit, and wherein, during the second time segment, the intermediate frequency signal is transferred through a second path comprising a second high-pass filter circuit.

3. The method of claim 1, further comprising:
   generating a transmission signal to produce the reception signal, the reception signal being a result of a reflection of the transmission signal at a detection target, wherein the transmission signal is chirp-modulated with a sequence of chirp ramps.

4. The method of claim 3, further comprising discontinuously activating a transmission amplifier and amplifying the transmission signal using the transmission amplifier.

5. The method of claim 4, further comprising activating the transmission amplifier during the sequence of chirp ramps.

6. A circuit, comprising:
   an input node configured to receive a received signal reflected from a target and to frequency down-convert the received signal to an intermediate frequency signal, the received signal comprising a sequence of chirp ramps; and
   a high-pass filter circuit configured to receive the intermediate frequency signal and produce a high-pass filtered signal, the high-pass filter circuit configured to
      filter the intermediate frequency signal during a first time segment of a chirp ramp with a first corner frequency, and
      filter the intermediate frequency signal during a second time segment of the chirp ramp with a second corner frequency, the first corner frequency being higher than the second corner frequency.

7. The circuit of claim 6, further comprising:
   an output node coupled to an output of the high-pass filter circuit, wherein the high-pass filter circuit is between the input node and the output node, wherein the high-pass filter circuit comprises a first high-pass filter circuit having the first corner frequency and a second high-pass filter circuit with the second corner frequency.

8. The circuit of claim 7, further comprising:
   a first switch activatable to direct the intermediate frequency signal from the input node towards either one of the first high-pass filter circuit or the second high-pass filter circuit; and
   a second switch activatable to direct, towards the output node, the high-pass filtered signal from either one of the first high-pass filter circuit or the second high-pass filter circuit.

9. The circuit of claim 8, wherein the first switch and the second switch are jointly activatable to provide a first filtering path and a second filtering path for the intermediate frequency signal from the input node to the output node via the first high-pass filter circuit and the second high-pass filter circuit, respectively.

10. The circuit of claim 6, further comprising a chirp modulator configured to generate a transmission signal to produce the received signal as a result of a reflection of the transmission signal at the target, wherein the chirp modulator is configured to produce the sequence of chirp ramps, wherein the high-pass filter circuit is coupled to the chirp modulator to provide, at each chirp in the chirp modulation, an alternated activation of the first high-pass filtering arrangement and the second high-pass filtering arrangement.

11. The circuit of claim 6, further comprising an output node, with the high-pass filter circuit is between the input node and the output node, and wherein the output node comprises an amplifier active on the high-pass filtered signal from the high-pass filter circuit.

12. The circuit of claim 11, wherein the amplifier comprises a variable gain amplifier.

13. The circuit of claim 6, further comprising:
   a chirp modulator configured to generate a transmission signal to produce the received signal as a result of a reflection of the transmission signal at the target, wherein the chirp modulator is configured to produce the sequence of chirp ramps; and
   a transmission amplifier configured to amplify the transmission signal, the transmission amplifier being activatable discontinuously.

14. The circuit of claim 13, wherein the transmission amplifier is configured to be enabled during the sequence of chirp ramps.

15. A radar sensor system, comprising:
   a circuit comprising:
      an input node configured to receive a reception signal that is chirp-modulated with a sequence of chirp ramps and to frequency down-convert the reception signal to an intermediate frequency signal; and
      a high-pass filter circuit configured to receive the intermediate frequency signal and produce a high-pass filtered signal, the high-pass filter circuit configured to
      filter the intermediate frequency signal during a first time segment of a chirp ramp with a first corner frequency and filter the intermediate frequency signal during a second time segment of the chirp ramp with a second corner frequency, the first corner frequency being higher than the second corner frequency
   a transmitter antenna configured to transmit a transmission signal to produce the reception signal as a result of a reflection of the transmission signal at a detection target; and a receiver antenna configured to receive the reception signal, the receiver antenna being coupled to the input node of the circuit to transfer the reception signal to the circuit.

16. The radar sensor system of claim 15, wherein the circuit further comprises:
   an output node coupled to an output of the high-pass filter circuit, wherein the high-pass filter circuit is intermediate the input node and the output node, wherein the high-pass filter circuit comprises a first high-pass filter circuit having the first corner frequency and a second high-pass filter circuit with the second corner frequency.

17. The radar sensor system of claim 16, wherein the circuit further comprises:
   a first switch activatable to direct the intermediate frequency signal from the input node towards either one of the first high-pass filter circuit or the second high-pass filter circuit; and
   a second switch activatable to direct, towards the output node, the high-pass filtered signal from either one of the first high-pass filter circuit or the second high-pass filter circuit.

18. The radar sensor system of claim 17, wherein the first switch and the second switch are jointly activatable to provide a first filtering path and a second filtering path for the intermediate frequency signal from the input node to the output node via the first high-pass filter circuit and the second high-pass filter circuit, respectively.

19. The radar sensor system of claim 15, wherein the circuit further comprises a chirp modulator configured to generate a transmission signal to produce the reception signal as a result of a reflection of the transmission signal at a detection target, wherein the chirp modulator is configured to produce the sequence of chirp ramps, wherein the high-pass filter circuit is coupled to the chirp modulator to provide, at each chirp in the chirp modulation, an alternated activation of the first high-pass filtering arrangement and the second high-pass filtering arrangement.

20. The radar sensor system of claim 15, wherein the radar sensor system is installed in a vehicle.

\* \* \* \* \*